Figure 1:
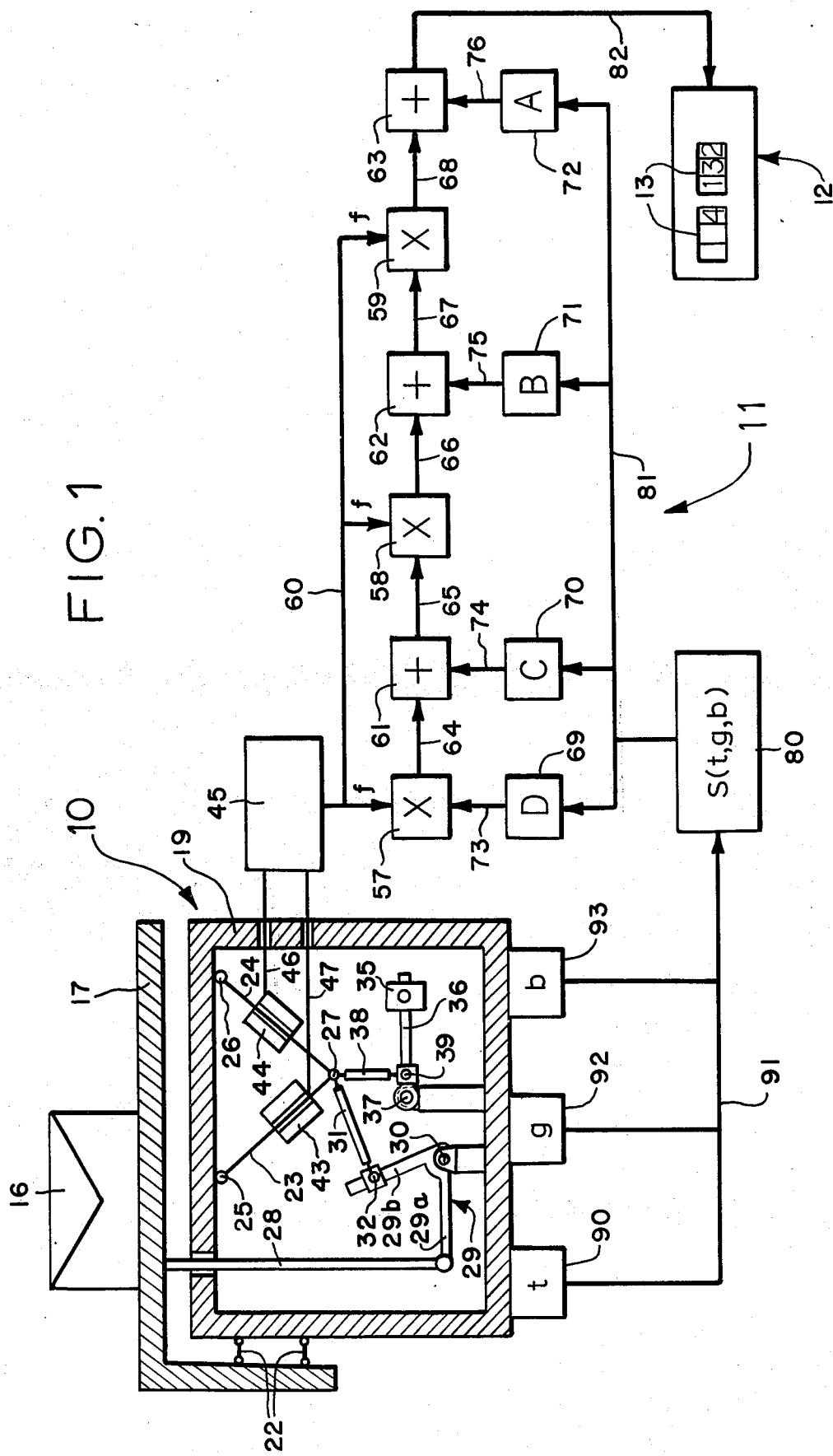

United States Patent [19]

Engels

[11] 4,070,900
[45] Jan. 31, 1978

[54] WEIGHING APPARATUS

[75] Inventor: Mathijs Maria Johannes Engels, Alphen Aan de Rijn, Netherlands

[73] Assignee: Maatschappij van Berkel's Patent N.V., Rotterdam, Netherlands

[21] Appl. No.: 680,961

[22] Filed: Apr. 27, 1976

[51] Int. Cl.² .............................................. G01G 3/16
[52] U.S. Cl. ........................................ 73/1 B; 177/25; 177/210 FP; 364/567; 364/571
[58] Field of Search ................................. 73/1 R, 1 B; 235/151.33; 177/25, 210

[56] References Cited
U.S. PATENT DOCUMENTS

| | | |
|---|---|---|
| 3,885,427 | 5/1975 | Melcher .................... 177/210 F P |
| 3,976,150 | 8/1976 | Wilson ............................. 73/1 B |
| 3,979,581 | 9/1976 | Revland ..................... 235/151.33 |

*Primary Examiner*—S. Clement Swisher
*Attorney, Agent, or Firm*—Lockwood, Dewey, Zickert & Alex

[57] ABSTRACT

A weighing apparatus for measuring loads having a movement with one or more vibrating strings where the mechanical elements of the movement are non-adjustable and further including an evaluating device with arithmetic logic units for introducing constants into the evaluating device that can be adjusted during initial calibration of the apparatus to remove errors inherent in the movement.

9 Claims, 2 Drawing Figures

WEIGHING APPARATUS

This invention relates in general to a weighing apparatus for measuring loads, and more particularly to a weighing apparatus having a mechanical movement with a plurality of movable parts together with an electrical evaluating device for receiving a signal from the movement and converting it into a measured value that is digitally displayed, and still more particularly to a weighing apparatus where the movement includes one or more vibrating strings subjected to the load of the weight to be determined where a frequency signal is received by the evaluating device and converted into a digitally displayed value.

It has been known to provide accurate measuring apparatus for the determination of weight which includes a movement having two vibrating or oscillating strings loaded by a fixed reference force and the weight of the article being weighed wherein the frequencies of the vibrating or oscillating strings are converted to a weight value as set forth in German Pat. No. 1,279,379. However, a measuring apparatus of this type must include costly adjusting devices and/or operations which greatly increase the production costs of such an apparatus. For example, the zero point must first be set and then the correct reading for maximum load must be adjusted. Additionally, an adjustment must be made to remove a curvature deviation in the measuring characteristic which defines the relation between the measurement signal and the corresponding weight value. Accordingly, a linear characteristic may then finally be obtained within a restricted measuring range following the adjustment procedures. It is also known to provide a further adjusting device for such a weighing apparatus to correct a cubic linearity error of the measured value so as to extend the measuring range as shown in German Pat. No. 1,958,976. Accordingly, it can be appreciated that the adjusting mechanisms for a weighing apparatus of this type are several, and further the amount of time needed to regulate or set the adjusting mechanisms to obtain an accurate adjustment is considerable and costly. It therefore can be recognized the cost of such a weighing apparatus where accuracy is demanded rises disproportionately with respect to the increasing accuracy of the measuring apparatus.

The weighing apparatus according to the present invention provides a high accuracy in the measurement of loads without the necessity of including costly adjusting devices for the movement and costly adjusting procedures associated with the adjusting devices. Thus, the weighing apparatus of the invention may be adjusted for accurate measurement through the performance of quick and easy adjusting procedures. This is accomplished by constructing the mechanical elements of the movement and the relative connections between the elements such that no adjustment can be obtained in the movement. Such a movement is obviously simpler and less costly to manufacture. However, adjustment is made simply by uniquely providing adjustable units or modules in the electrical or electronic evaluating device which receives signals from the movement and converts them to a measured value. More specifically, adjustments for providing correct measured values in the indicating unit are accomplished by use of arithmetic logic units or devices which introduce "$n$" constant values into the evaluating device. The arithmetic logic units define a circuit coacting with the evaluating device capable of adding the $n$ terms of a polynomial of the $n$th degree where the independent variable of the polynomial is the measured signal received from the movement and where the dependent variable is the unknown measured value of the load, and further where the magnitude of the coefficients of the terms of the polynomial equal the $n$ constant values.

The present invention eliminates the time-consuming and costly adjustment procedures of mechanical elements in heretofore known movements. It can be appreciated the constant values utilized in the evaluating device relate to the individual measured signal output of the movement such that the indicating unit receiving the output of the evaluating device displays the exact measured value. Therefore, the heretofore necessary mechanical adjustments made in a movement are eliminated in the present invention where greater accuracy can be obtained by adjustment of the arithmetic logic units in the evaluating device in relation to a specific measurement signal received from the movement.

Adjustment is accomplished in the simplest possible manner depending upon the special mechanical properties of the movement employed by introducing suitable constants into the computer or evaluating device through arithmetic logic units where the constants are utilized in a polynomial of the $n$th degree by conventional adders and multipliers. The arithmetical operations for introducing the constants can be easily accomplished with a modern microcomputer. It therefore can readily be seen that the costs required for adjusting the weighing apparatus according to the invention will not substantially rise in relation to the increase in the accuracy of the measuring apparatus.

It is therefore an object of the present invention to provide a new and improved weighing apparatus capable of easily and inexpensively being adjusted for accurate measurement of loads.

Another object of this invention is in the provision of a weighing apparatus utilizing a movement for a vibrating string and an electrical evaluating device for converting a measurement signal from the string to a measured value in a digital indicator wherein simple and easy adjustments can be made in the electrical evaluating device for obtaining a high standard of accuracy in the apparatus.

A still further object of the invention is in the provision of a weighing apparatus having an electrical evaluating device for converting a weighing measurement signal from the movement of the apparatus to a digital measurement value wherein an adjustment of the apparatus for providing a high degree of accuracy is capable by introducing suitable constants through arithmetic logic units or devices where the constants are processed in the manner of a polynomial of the $n$th degree.

Figure 2:
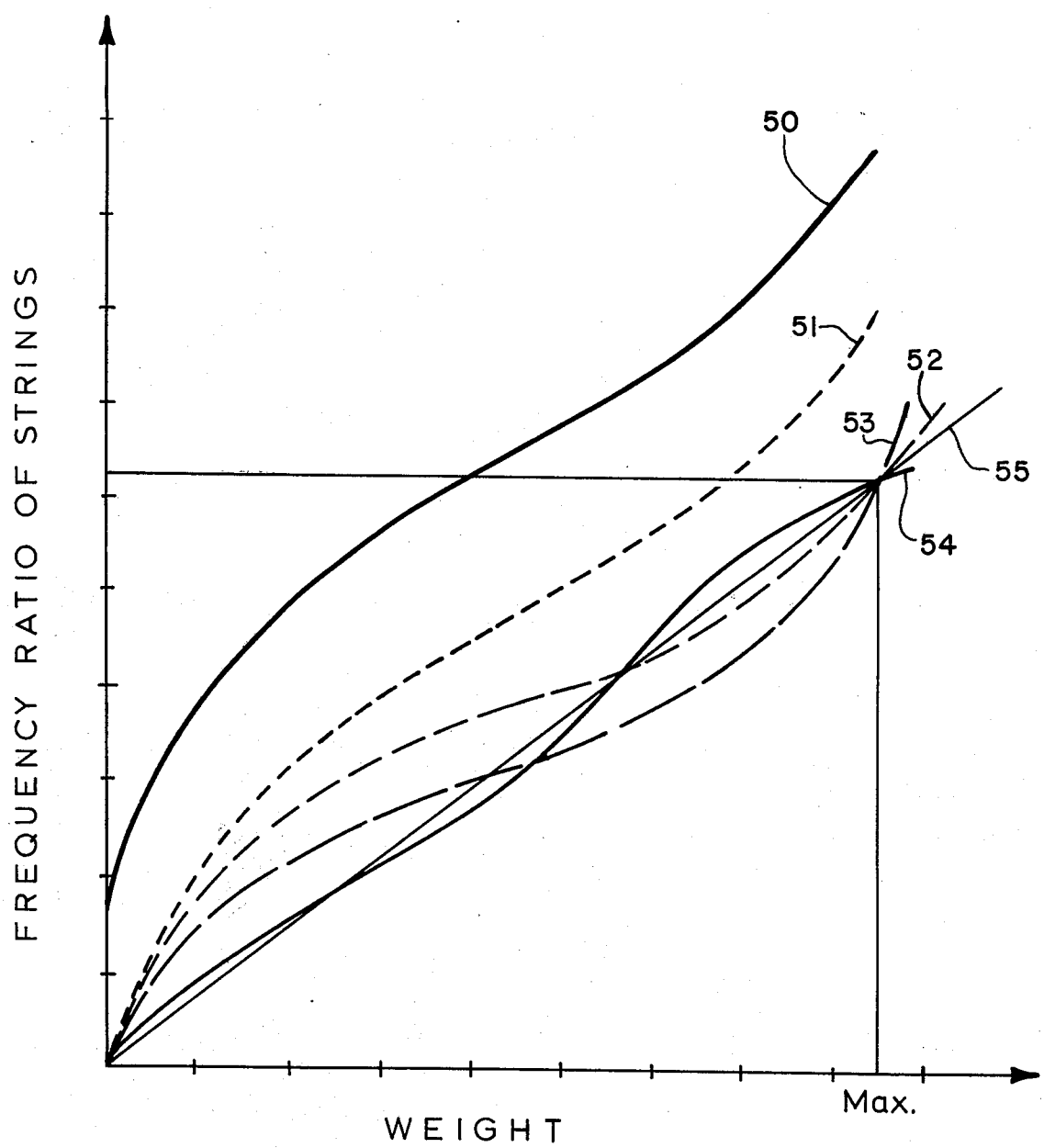

Other objects, features and advantages of the invention will be apparent from the following detailed disclosure, taken in conjunction with the accompanying sheets of drawings, wherein like reference numerals refer to like parts, in which:

FIG. 1 is a partially schematic view and partially block diagram of the measuring apparatus according to the present invention; and FIG. 2 is a graphical illustration showing various characteristics of a weighing apparatus of the vibrating string type to illustrate the adjusting procedures required to obtain a high degree of accuracy in the measurement of masses or forces.

Referring now to the drawings and particularly to FIG. 1, the weighing apparatus of the present invention is illustrated which includes generally a conventional movement 10 for producing a measurement signal and an electrical or electronic evaluating device 11 for converting the measurement signal to a digital measurement value that is displayed on the indicator unit 12 in the window 13 thereof.

The movement 10 receives an input force from a load in the form of an article to be weighed such as the article 16 resting on a weighing platform 17, which is mounted for vertical movement relative to a housing or base 19 by parallelogram levers or linkages 22. The force or mass applied by the weighing platform 17 is transmitted through a linkage assembly to a pair of vibrating or oscillating strings 23 and 24 mounted within the housing 19. The strings are respectively connected to the housing at one of their ends at points 25 and 26 and commonly with one another at their other ends at point 27.

The force generated by the load on the weighing platform through the article 16 is applied to the common point 27 of the strings by means of a generally vertically extending platform lever or rod 28 pivotally connected at its lower end to a generally V-shaped linkage or crank-arm lever 29 pivotally mounted at 30 to a support on the housing 19 and having an arm 29a pivotally connected to the lever 28 and an arm 29b connected through a link 31 to the vibrating strings connection 27. The link 31 is connected to the arm 29b at point 32. A reference force applied to the connection point 27 of the vibrating strings is generated by a weight 35 of a predetermined value mounted on the end of a bar 36 pivoted at 37 to a support on the housing 19. The reference force is transmitted to the common connection point 27 of the vibrating strings through a link 38 connected at one end to the point 27 and at the other end to the bar 36 at 39. Accordingly, the vibrating strings 23 and 24 are subjected to a reference force of the weight 35 and are constantly under a predetermined tension thereby and a load force of the article 16, both of which tension the strings. The reference force is constant, while the measurement force or force to be measured will vary depending upon the weight of the article 16. It can therefore be seen that the resulting tensioning force on the strings 23 and 24 is a variable of the weight of the article 16.

The vibrating strings 23 and 24 are magnetically excited into transverse vibrations by combination excitation and sensing units or heads 43 and 44. The natural vibrations set up in strings 23 and 24 by the reference force produced by weight 35 and the weight force produced by the weight of the article 16 are sensed by the units 43 and 44 and fed to a frequency meter 45 along connecting lines 46 and 47. The frequency ratio of the strings is converted by the frequency meter 45 to a frequency signal, and it can be appreciated that the frequency ratio depends upon the magnitude of the load on the weighing platform 17. Further, the frequency meter 45 constitutes the input to the electrical evaluating device 11 and the output of the device is fed to the indication unit 12, wherein the weight of the article 16 is digitally displayed at the indicator unit.

Heretofore, the movement of a weighing apparatus, such as the movement 10, had to be adjusted mechanically to remove errors. More particularly, this was accomplished by adjusting the length of various links and the connections between the links. With reference to the movement 10, such adjustments would first involve shifting of the fixed points 25 and 26 of the strings 23 and 24 and by changing the position of the common connection 27 of the strings. Further adjustments were made by shifting the position of the reference weight 35 on the bar 36 and by changing the position of the connection 39 along the bar 36 together with changing the lengths of the links 29a, 29b, 36 and 38. The location of the link point 32 on arm 29b could also be changed. With reference to FIG. 2, the characteristic of the movement as represented by curve 50 had to be changed until the characteristic of the movement conformed to the correct final form of curve 54 as would be accomplished by the adjustments in the movement above indicated to assure the exact value of the weight would be displayed in the indication unit 12.

It should be appreciated that various characteristics of a movement such as movement 10 is illustrated in FIG. 2 so that the invention may be better understood. The frequency ratio of the strings is plotted along the ordinate, whereas the corresponding weight of the load on the weighing platform 17 as represented by the article 16 is plotted along the abscissa. Prior to the adjustment of a movement of the type herein referred to after it has been assembled, the characteristic will be generally in accordance with the solid curve 50. As above explained, it was heretofore necessary to perform a plurality of mechanical adjustments on such a movement to change the characteristic of the movement according to curve 50 in a step-by-step fashion in order to match the mode of operation of the movement to the parameters of the evaluating device so that the correct value of a load on the weighing platform to be represented in the digital indicator 12 would correspond to the momentary frequency ratio of the vibrating strings caused by the load.

The various adjustments needed for the movement first require shifting of the zero point of the calibration curve to zero as indicated by the dash curve 51. It was thereafter necessary to change the range between zero and the maximum weight to be encountered where the curve would then be changed to the curve 52. Next, linearity adjustments had to be accomplished to first eliminate a so-called "curvature error" thereby resulting in the curve 53. And finally, following the elimination of cubic errors, the ultimate curve 54 would be accomplished which substantially approaches the desired linear relationship between the load on the weighing platform and the frequency ratio indicated by the thin line 55. It must be appreciated that this desired linear relationship is restricted to the measuring range between zero and maximum load since the characteristic curve 54 substantially deviates from the linearity line 55 beyond the maximum weight chosen. It can therefore be appreciated that the execution of these adjusting operations as above referred to in connection with heretofore weighing apparatus required highly skilled technical personnel and considerable adjusting time.

According to the present invention, an electrical evaluating device as diagrammatically illustrated in FIG. 1 and generally designated by the numeral 11 is employed to completely eliminate any time-consuming and costly mechanical adjustments of the movement. As will be more clearly understood hereafter, it can be appreciated the mechanical components of the movement 10 can be assembled without regard to measurement errors inherent in a weighing apparatus of the type herein disclosed. Thus, the movement 10 after assembly would exhibit errors in a measurement such as represented by the characteristic curve 50 shown in FIG. 2.

The construction of the circuitry of the electrical evaluating device 11 automatically accounts for the individual errors in measurement, and it is only necessary to feed to the computing device of the evaluating device constants which match the specific properties of the movement. By the use of test weights applied to the weighing platform 17, the constants for the evaluating device can be simply, accurately and quickly determined to be inserted into the evaluating device and eliminate the measurement errors in the following manner.

In order to explain the present invention and the manner in which a weighing apparatus according to the invention can be adjusted to calibrate the apparatus and provide the correct weight measurements, it may be assumed that the movement 10 has a characteristic of the type illustrated by the curve 50 in FIG. 2. Further, the frequency signal $f$ hereafter referred to will relate to the presence of only a single string for purposes of explanation which may be utilized in the movement within the scope of the invention even though it is the frequency ratio of strings 23 and 24 that is received by the frequency meter 45. Accordingly, reference to the frequency of oscillations or vibrations will be understood to also relate to the frequency ratio.

The weight of a load may be referred to as G as represented according to the corresponding frequency $f$ by the polynomial equation:

$$G = a_0 + a_1 f + a_2 f^2 + a_3 f^3 + \ldots a_n f^n \qquad (1)$$

By suitably choosing the coefficients, $a_0, a_1, \ldots a_n$, a relationship of any desired amount can be achieved between the frequency $f$ and the unknown value of weight G. In most situations, it is sufficient to consider only the first four terms of the equation (1). The electrical evaluating device 11 according to the invention is structured in relation to the equation and includes a plurality of arithmetic units or components.

More specifically, the electrical evaluating device 11 includes three multiplication units or components 57, 58 and 59 which receive the input frequency $f$ from the frequency meter 45 by the connecting line 60. The multiplication units are arranged alternately with addition units or components 61, 62 and 63. The multiplication units are connected in series with the addition units by connecting lines 64, 65, 66, 67 and 68. The first in the series of multiplication units and each of the addition units are interconnected with arithmetic logic units 69, 70, 71 and 72 through connecting lines 73, 74, 75 and 76. The arithmetic logic units 69, 70, 71 and 72 respectively feed constants to the multiplication unit 57 and addition units 61, 62 and 63. A control unit 80 is connected through a line 81 to the arithmetic logic units 69, 70, 71 and 72. The output line 82 coming from the last addition unit 63 and constituting the output of the electrical evaluating device feeds the output signal to the indication unit 12 where the value of weight G is digitally displayed in the window 13.

Adjusting of the weighing apparatus to compensate for the errors inherent in the movement 10 will be illustrated where the first four terms of the equation (1) are utilized, thereby necessitating the determination of only the first four coefficients $a_0, a_1, a_2$ and $a_3$. Accordingly, the weighing platform 17 will be individually loaded with four calibrated weights G1, G2, G3 and G4, where G1 = 0, G4 represents full maximum load, G2 represents one-third of full load, and G3 represents two-thirds of full load. It will be seen that the proper four constants for the arithmetic logic units 69, 70, 71 and 72 will be determined for the evaluating device 11 during comparison of the calibrated weight and the weight represented at the indication unit. Initially, the units 69, 70, 71 and 72 are adjusted to four arbitrary constant values. For this test method the units 69, 70 and 72 are adjusted to zero and the constant $a_1 = 1$ is introduced into the unit 71. Accordingly, the value of four different frequencies $f1, f2, f3$ and $f4$ corresponding to the four calibrated weights G1, G2, G3 and G4 can be read out at the indication unit 12. Taking these values for G and $f$, four equations are yielded from the equation (1) to determine the coefficients $a_0, a_1, a_2$ and $a_3$, wherein $a_0 = A, a_1 = B, a_2 = C$, and $a_3 = D$. Where the electrical evaluating device 11 is a microcomputer, these coefficients may be determined by the device itself. As can be seen in FIG. 1, the individual constants A, B, C and D, as determined through the equations, are put into the arithmetic logic units 69, 70, 71 and 72 through the control unit 80. The weighing apparatus is thereby finally adjusted for the exact determination of all weight measurements in accordance with the load of the article placed upon the weighing platform 17.

It can therefore be appreciated that no time-consuming adjusting operations of the movement 10 are required in addition to the simple determination and introduction of constants A, B, C and D into the evaluating device. Further, every weighing apparatus according to the inherent behavior of its movement would be adjusted with its specific constants A, B, C and D by the above described test method. It can further be appreciated that the predetermined constants A, B, C and D may be introduced into the electrical evaluating device manually or automatically by means of the control unit 80.

When a weighing apparatus has been adjusted in accordance with the above method, it may be appreciated it will operate to provide the correct weight measurement readout at the indication unit 12 in the following manner. Following the placing of a load on the weighing platform 17 of the movement 10, the frequency meter 45 will read out the frequency ratio of the strings and feed a signal through the connecting line 60 to the first multiplication unit 57. The preset constant D in the arithmetic logic unit 69 is simultaneously fed to the multiplication unit 57 whereby the signal D$f$ is delivered to the first addition unit 61 along the line 64. The next constant C preset in the arithmetic logic unit 70 is delivered along the line 74 to the first addition unit 61 which then delivers a signal D$f$+C along connecting line 65 to the second multiplication unit 58. A signal $f$ is received by the second multiplication unit 58 which thereby feeds a signal D$f^2$+C$f$ over connecting line 66 to the second addition unit 62. The preset constant B in the arithmetic logic unit 71 is simultaneously fed to the second addition unit 62 along line 75 whereby the signal D$f^2$+C$f$+B is fed to the third multiplication unit 59 along connecting line 67. The frequency signal $f$ is also fed to the third multiplication unit 45 along the connecting line 60, whereby the third multiplication unit 59 feeds a signal D$f^3$+C$f^2$+B$f$ along connecting line 68 to the third addition unit 63. The last preset constant A is delivered along connecting line 76 from the arithmetic logic unit 72 to the last addition unit 63, whereby the signal in the output line 82 leading to the indication unit 12 appears as $Df^3 + Cf^2 + Bf + A$. Thus, even though the movement 10 would exhibit the characteristic curve 50 shown in FIG. 2, the exact value of the weight measurement is obtained in the indication unit 12 through the electrical evaluating device 11 with the preset constants. Accordingly, no mechanical adjustments of zero, range of measurement or linearity are required.

It should be appreciated that it may sometimes be advantageous to use a larger number of calibrated weights during the calibration of the weighing apparatus for determining the mean value of the constants. Further, if a greater accuracy of measurement is desired, such as to obtain a more precise weight measurement, one or more additional terms may be added to the polynomial equation (1). It can be appreciated then that a corresponding number of multipliers and adders, together with arithmetic logic units for establishing the constant, would need to be incorporated into the circuit of the evaluating device 11. Further, one or more additional calibrated weights would need to be utilized in the calibration process of the weighing apparatus for determining the constants. In order to determine the appropriate number of coefficients, there must be provided a corresponding number of equations from the predetermined calibrated weights for the number to be tested of the different frequencies. It therefore can be seen there would be needed a like number of calibration weights for determining the number of constants in accordance with the number of terms of the equation. Likewise, the number of constants would determine the number of arithmetic logic units needed in the evaluating device 11, as one unit would be needed to introduce each constant.

While it is always intended to use a network of components in the evaluating device corresponding to the equation (1), it can be appreciated it would be possible to utilize a different arrangement of individual arithmetic modules for performing the necessary arithmetical operations if, for example, the arithmetic units employed could form squared and third powers.

As also shown in FIG. 1, it would be possible to control the value of the constants A, B, C and D in the arithmetic logic units 72, 71, 70 and 69 by the control unit 80, further depending upon other factors that might affect the weight measurements, such as ambient temperature, gravitational forces where the apparatus is used, and vibrations of the support on which the weighing apparatus is placed. In order to compensate for such factors to obtain greater accuracy, appropriate sensing devices are connected to the control unit 80 to apply one or more input signals for automatically adjusting the constants.

A temperature measuring instrument 90 is provided with the apparatus and suitably mounted thereon for measuring ambient temperature $t$. The temperature measuring instrument is connected to the control unit 80 by a line 91 so that the four constants A, B, C and D may be regulated through the control unit for further calibration of the evaluating device in the event of a change in ambient temperature. This will enable elimination of higher order errors in measurement which could not be heretofore taken into account by the evaluating device.

The determination of the weight G of a given mass on the weighing platform depends upon the gravitational forces at the location of the weighing apparatus. Such an error produced by a particular gravitational force is eliminated in the present invention by use of a gravity measuring instrument 92 which is also mounted on the apparatus in a suitable manner and connected by line 91 to the control unit 80. The variation in gravity force is therefore connected to the control unit 80 which correspondingly regulates the constants A, B, C and D.

Finally, a vibration measuring instrument 93 may also be suitably mounted on the weighing apparatus for measuring shocks or vibration imparted to the weighing apparatus. The vibration measuring instrument is also connected to the line 91 by the control unit 80 and variation in the measurements made by this instrument likewise can momentarily change the values of the constants A, B, C and D.

It may be appreciated that the present invention in the unique evaluating device may be applicable to other weighing movements than that disclosed where there are a pair of vibrating strings 23 and 24. For example, the movement may only comprise a single vibrating string which may or may not have a fixed reference force applied to it. Such a movement would not affect the operation of the evaluating device 11 of the invention.

It can be appreciated that the present invention depends on frequency counting or measuring of frequency, thereby detecting the momentarily existing frequency of the vibrating strings during any one weighing operation, whereby the value of the frequency relates to the weight value. It is therefore advantageous to utilize the smallest possible frequency counters that are compact, inexpensive and have a low dissipation of heat. Their compactness saves space requirements and overall simplifies the structure of the apparatus. It is also important that the count be made as quickly as possible, but it can be appreciated that such should not be done at the cost of the high resolution of frequency counting. Accordingly, microprocessors are utilized for counting of frequencies in the structure of the movement shown in FIG. 1 where two vibrating strings 23 and 24 are provided. The number of vibrations with frequency $f1$ of string 24 may be counted over short periods of time during which a reference string such as string 23 performs a given relatively small number of vibrations such as 16 vibrations. This process is frequently repeated, such as about 400 times, and the results are arithmetically processed as already described. The counting of pulses requires only a small calculating capacity in the computers so that the high capacities of the computers still remain available for further arithmetic operations needed to process the frequency data.

It will be understood that modifications and variations may be effected without departing from the scope of the novel concepts of the present invention, but it is understood that this application is to be limited only by the scope of the appended claims.

The invention is hereby claimed as follows:

1. A weighing apparatus for measuring loads comprising, a weight receiving member, means for producing a vibrations signal which includes at least one differentially loaded vibrating string held under a predetermined tension, means connecting one end of the string to said weight receiving member, and means responsive to vibrations of said string for generating a frequency signal that is a function of the frequency of the vibrations of said string, said vibrations signal producing means being unadjustable and therefore incapable of compensating for any errors inherent therein, a digital indicator for indicating a digital weight measurement of a load on the weight receiving member, an evaluating device connected between the means generating said frequency signal and said indicator for converting said frequency signal to a signal for said digital indicator including a plurality of serially connected arithmetic components receiving said frequency signal, and means for calibrating the components and thereby the apparatus to produce accurate weight measurements, said calibrating means including a plurality of adjustable arithmetic logic units for producing constant inputs to said components for adjusting the relationship between calibrated weights and the frequency signals generated by said weights to calibrate the apparatus for obtaining the correct weight measurements at the digital indicator over a given range.

2. A weighing apparatus as defined in claim 1, which further includes means sensing conditions affecting the accuracy of a weight measurement and compensating for same by calibrating the apparatus through an adjustment of the arithmetic logic units.

3. A weighing apparatus as defined in claim 2, wherein said condition sensing means includes a temperature measuring instrument for measuring ambient temperature at the apparatus.

4. A weighing apparatus as defined in claim 2, wherein said condition sensing means includes a gravitational measuring instrument for measuring gravitational force at the apparatus.

5. A weighing apparatus as defined in claim 1, wherein said means for producing a vibrations signal includes a pair of vibrating strings.

6. A weighing apparatus for measuring loads comprising, a weighing platform for receiving a load to be weighed, a movement connected to said platform, said movement including at least one vibrating string and an exciting and sensing head coacting with the string for vibrating the string transversely and sensing the frequency of vibration, an evaluating device receiving the frequency signal from the head and converting the signal to one for driving a digital indicator, said movement including a plurality of mechanical members that are unadjustable and therefore incapable of compensating for any errors inherent therein, said evaluating device including a plurality of arithmetic components and a plurality of arithmetic logic units for introducing constants into the arithmetic components for adjusting the relationship between calibrated weights and the frequency signals generated by said weights to calibrate the apparatus for obtaining the correct weight measurements at the digital indicator, said arithmetic logic units corresponding to the addition of $n$ terms ($a_0, a_1 f, \ldots, a_n f^n$) of a polynomial of the $n$th degree, where the independent variable is the frequency signal representing the weight measurement and the dependent variable is the unknown measured value of the load and the magnitude of the $n$ coefficients ($a_0, a_1, a_2, a_3$) of the terms of the polynomial is equal to the $n$ constants.

7. A weighing apparatus as defined in claim 6, which further includes means sensing conditions affecting the accuracy of a weight measurement and compensating for same by calibrating the apparatus through an adjustment of the arithmetic logic units.

8. A weighing apparatus for measuring loads comprising, a load receiving member, a movement for converting the force of a load on said member to a frequency signal wherein the magnitude of the frequency signal is a function of the magnitude of the load, said movement being unadjustable and therefore incapable of compensating for any errors inherent therein, a digital indicator for indicating a digital weight measurement of a load on the load receiving member, and an evaluating device connected between said movement and said digital indicator having a plurality of arithmetic components computing a weight measurement signal for the digital indicator, and means for calibrating the components to compensate for any errors in the movement to obtain accurate measurement of weight at said indicator of a load on the load receiving member including a plurality of adjustable arithmetic logic units feeding calibrating constants to the components, said components and units coacting in accordance with a polynomial equation $G = a_0 + a_1 f + a_2 f^2 + a_3 f^3 + \ldots a_n f^n$, where G equals weight, $f$ equals the frequency signal and $a_1, a_2, a_3, a_n$ equal the calibrating constants, and means connected to said calibration means sensing conditions affecting the accuracy of a weight measurement and compensating for same be adjusting said calibration means.

9. The method of calibrating the weighing apparatus defined in claim 1 comprising the steps of, successively loading the weight receiving member with a given number of calibrated weights equal to the number of logic units and available constants, adjusting the units to produce arbitrary constant values, solving the equation for each frequency and corresponding weight to determine the constant for each term of the equation, and adjusting the logic units in accordance with the calculated constants.

* * * * *

UNITED STATES PATENT AND TRADEMARK OFFICE
CERTIFICATE OF CORRECTION

PATENT NO. : 4,070,900
DATED : January 31, 1978
INVENTOR(S) : Mathijs Maria Johannes Engels It is certified that error appears in the above-identified patent and that said Letters Patent are hereby corrected as shown below:

On the title page, after the filing date, insert

--Foreign Application Priority Data

May 2, 1975   Germany   P 25 19 727.7--;

In the References Cited, change "Revland" to --Reuland--;

Col. 10, line 38, change "be" to --by--.

Signed and Sealed this

Eleventh Day of July 1978

[SEAL]

Attest:

RUTH C. MASON
Attesting Officer

DONALD W. BANNER
Commissioner of Patents and Trademarks